United States Patent Office 3,652,745
Patented Mar. 28, 1972

3,652,745
METHOD OF FABRICATING POROUS METAL BODIES
Neal P. Strazza, Towson, Md., assignor to Isotopes, Inc., Westwood, N.J.
No Drawing. Filed July 30, 1969, Ser. No. 846,284
Int. Cl. G21c *21/00, 21/02*
U.S. Cl. 264—.5                              24 Claims

ABSTRACT OF THE DISCLOSURE

In the fabrication of porous metal bodies, and in particular, control bodies for nuclear reactors with or without integral fuel material, by powder metallurgical techniques, the utilization of a metal hydride binder imparts green strength to the body formed prior to sintering and results in a sintered body with smooth, strong bonds connecting the powder particles and with clean, uncontaminated interior surfaces.

BACKGROUND OF THE INVENTION

Nuclear reactor systems and means for regulating and controlling the nuclear reactions occurring therein are described in copending application Ser. No. 374,656, of Robert Magladry, filed June 12, 1964, now abandoned. Briefly, the operation of these systems is as follows: The nuclear reaction is generally controlled by the insertion or rotation of a regulating or control rod into the nuclear composition. This rod can contain a neutron absorbing material which reduces the nuclear reaction rate, fissionable material which increases the reaction rate or neutron scattering or moderating material which also increases the reaction rate by increasing the probability that neutrons will cause fission before they are lost through non-fission absorption or leakage.

One such system comprises a self-regulating, mechanically passive control system for a nuclear reactor having as its main section a reactive composition comprised of regions containing fissionable material, that is, reactor fuel, which are commonly termed core and may have within this section regions containing non-fissionable material which are commonly termed reflector. The control system incorporates a control rod of hydride material which is fixed with respect to the main reactor section such that one end of the rod is positioned internally within the section and the other end protrudes exteriorly thereof. Fissionable material, that is, reactor fuel or other material subject to nuclear heating is incorporated within the internal end of the rod and means are provided for producing a temperature differential between the external and internal ends of the rods to vary the hydrogen concentration within the respective ends of the rod. More than one control rod may be utilized in the control system. When these control rods contain reactor fuel, they also serve as reactor fuel elements in the conventional sense.

These control bodies are generally composed of a hydridable material, such as zirconium, yttrium, and uranium, which may also have a nuclear fuel material, such as the 235 isotope of uranium, incorporated therein. Rapid absorption and desorption of hydrogen and a low absorption cross section for neutrons are critical requirements of the hydridable material. Specifically, the moderation of the nuclear reaction is increased or decreased according to whether the hydrogen concentration in the main section is high or low. Hydrogen is especially desirable because it has the highest property, cross section, for slowing-down of neutrons of any known chemical species. Typical hydride control bodies are described in copending application Ser. No. 595,415, by Robert Magladry, filed Nov. 15, 1966, now abandoned. In a typical operation, it is often necessary to heat one end of these hydride bodies to effect dissociation of the hydrogen contained therein and transfer of the hydrogen through the rod to the other end where it recombines in hydride form.

In order to expedite the transfer of hydrogen, it is necessary that the control bodies be porous and have very large internal surface area. As described in copending application Ser. No. 594,415, now abandoned, it has been found that such bodies may be formed by sintering relatively large, spherical metal particles. (These bodies are formed by mixing the metal particles, preferably with a conventional organic binder and cold pressing to produce a green article which is transferred to a suitable furnace for sintering to form the final article.) The utilization of spherical particles results in a body possessing an interconnected porosity through which the hydrogen is free to pass.

To avoid the use of a die to contain the particles during the sintering process, the particles can be mixed with a binder and cold pressed to produce a green body. The body is then sintered, while free standing, in a suitable furnace to form the final product.

Conventional organic binders are unsuitable in this application because they tend to contaminate the interior surfaces of the hydride bodies. These binders are normally converted to gases during the sintering step which must be removed, requiring special apparatus. As these binder materials are decomposed, contamination of the resulting body with significant amounts of oxygen and, perhaps, nitrogen, is unavoidable. In addition, upon decomposition, these prior art binder materials often leave deposits of organic materials in the equipment utilized to sinter the article, thereby lengthening the maintenance procedures.

In the sintering process, it is desirable to develop strong diffusion bonds between the individual particles without significantly reducing the interconnecting porosity of the body. The use of organic binders along with normal compacting pressures and sintering temperatures inhibits the formation of these strong bonds. The higher compacting pressures and sintering temperatures required to develop such bonds sharply reduce the desired porosity.

There is a particular need, therefore, in the art of preparing control bodies for nuclear reactors by powder metallurgical techniques for a binder which will impart an adequate degree of green strength without contaminating the interior surfaces and which will permit, through sintering, the formation of strong bonds between particles without deleteriously affecting the porosity.

BRIEF DESCRIPTION OF THE INVENTION

Briefly, the invention relates to the utilization of a metal hydride binder material in powder metallurgical processes for imparting green strength to articles cold-pressed from base material particles having a relatively large particle size and a particular shape or configuration wherein it is desired to maintain a certain degree of porosity, uniformity of pore size, interconnections between pores, and the shape or configuration of the base material particles in the final pressed article.

DETAILED DESCRIPTION OF THE INVENTION

The base materials employed in the process of the invention may be any material normally employed in powder metallurgical processes. Generally, any metal or alloy thereof, in particulate form, may be employed. The process of the invention is preferably employed for the preparation of rigid, porous bodies from particulate material wherein it is necessary to maintain a certain degree of porosity and to maintain the size and shape or configuration of the individual particles of the base material. The process of the invention is particularly suited for the preparation of fuel and control elements for use in nuclear reactors. As discussed above, the complex and sensitive reactions which occur in nuclear reactors make it desirable that the fuel and control elements utilized therein have a definite and uniform structure. In certain structures, it is also desirable that the elements comprise porous bodies wherein the active material consists of relatively large particles having a definite shape or configuration wherein the degree of porosity and the interconnections between pores are uniform throughout.

Examples of such systems are the so-called fueled porous metal hydride moderator elements for use in nuclear reactors. It is necessary that these elements be capable of releasing and absorbing large quantities of hydrogen in relatively short periods of time. Uniform hydrogen absorption and release is necessary in order to afford optimum controllability of the nuclear reactor in which the moderator element is employed. Achieved performance can be obtained by forming the elements from particulate hydridable material of large particle size and having a substantially spherical shape and to insure that there is a uniform degree of porosity throughout the formed structure. The use of spherical particles insures an uninterrupted hydrogen flow throughout the element due to the absence of sharp edges or discontinuities which would impede the flow of hydrogen therethrough.

A porous control element body comprised of spheroidal particles is desirous for a still further reason. Upon taking in hydrogen, these bodies grow in volume and by yielding their hydrogen content, they shrink. The stress and strain produced by these volumetric changes have little effect on porous bodies. Such stresses and strains, however, may crack and break solid, non-porous forms.

It is to be understood, however, that the present invention is not limited to the production of fuel or control elements for use in nuclear reactors. Rather, the invention is applicable for the production of any solid, porous body produced by powder metallurgical techniques wherein it is desired to maintain a uniform degree of porosity and the structural identity of the base material particles. As stated above, the process of the present invention is applicable to the formation of bodies from base materials comprising any metal or metallic alloy, etc. More particularly, the process of the present invention is applicable in any powder metallurgical application wherein it is desired to impart a high degree of green strength to a compacted or extruded preform body prior to sintering so that it may be handled or transferred to other apparatus withous affecting the degree of porosity or the structural identity of the individual particles.

It is to be further understood that the process of the present invention is not limited to the utilization of spheroidal particles, but rather, includes the utilization of relatively large particles of any shape or configuration. For example, particles having regular or irregular angular shapes or configurations may be employed.

Generally, any metal hydride may be employed as the binder in the process of the invention. Preferably, the hydrides of the following metals may be employed: Li, Mg, Ca, Sc, Ti, V, Sr, Y, Zr, Nb, Pd, Ba, La, Hf, Ta, Ac, Ce, Pr, Nd, Sm, Eu, Gd, Tb, Dy, Ho, Er, Tm, Yb, Lu, Th, Pa, U, Pu.

It is preferable, also, to employ as a binder the hydride of the metal comprising the base material particles. For example, in preparing a zirconium control rod for a nuclear reactor, it would be preferable to employ zirconium hydride as the binder. It is to be understood, however, that, generally, it is not necessary to employ hydrides of the base metal.

The size of the base material particles and the size of the binder particles are not overly critical. The invention is generally applicable, however, to relatively large particles of base material. Generally, best results are obtained upon employing base materials having particles ranging from about 0.0005 inch to about 0.010 inch in diameter. Generally, the particle size of the binder material may vary from about $\frac{1}{10}$ to $\frac{1}{100}$ of the diameter of the base material particles. Generally, an amount of binder between about 7% and 25% by weight based on the base material may be employed. The employment of less than about 7% of binder material generally results in a green article having insufficient green strength to withstand normal handling operations.

One of the features of the present invention is that the use of a metal hydride binder eliminates the necessity for the addition of extraneous additives to the mixture. This enables the production of articles having a minimum of impurities. This becomes extremely important in the area of the preparation of fuel and control elements for use in nuclear reactors. The presence of even trace amounts of the oxygen and nitrogen impurities left by the use of conventional organic and inorganic binders deleteriously affects the operation of these reactors. The employment of pure metal hydride binders, however, insures the total elimination of such impurities from the resulting articles. Again, it is emphasized that the present invention is not restricted to the production of elements for use in nuclear reactors. The invention is equally applicable for the production of any articles wherein a high degree of purity must be maintained.

By utilizing metal hydride particles as binders according to the process of the present invention, the prior art difficulties are overcome. Upon applying pressure by compaction in a suitable die, extrusion apparatus or any other conventional system, the binder particles exert a binding action on the individual base particles while retaining the structural identity of the latter. As stated above, any conventional pressure applying technique may be employed to form the green article. For example, compaction in a mold or extrusion through a suitable die may be employed. Preferably, sufficient pressure is applied to the mixture to result in contact between the base particles without the deformation thereof so that upon sintering, only the desired amount of bonding occurs.

Obviously, the pressure will depend in each case on the base material, binder, size and shape of the particles, etc. Generally, however, pressures in the range of from 20 to about 30 t.s.i. may be employed.

The end product has a high and uniform degree of interconnecting porosity.

Sintering may be accomplished according to any of the conventional prior art procedures. For example, any apparatus capable of attaining high temperature levels may be employed. A distinct advantage of the process of the invention, however, is that the use of complicated and expensive vacuum furnaces necessary in the prior art processes for the outgassing of organic binder materials is not required.

Generally, sintering is a time-temperature related process in which either greater temperature and/or greater sintering times, result in a greater densification of the end product. In those instances where a highly porous product is desired, sintering is achieved at a relatively low temperature level and for a relatively short period of time so as to prevent densification of the resulting article. It is to be remembered that during the cold pressing operation, the green structure was exposed to only a degree of pressure sufficient to allow contact between the base material particles. Upon sintering, only a small degree of bonding occurs between the base material particles, without significant distortion to the structural identity thereof.

In the area of manufacturing control bodies for nuclear reactors, the sintering temperature may range from about 900° C. to about 1100° C. Generally, a temperature level is selected such that no densification of the final article takes place.

Moreover, it is necessary that the sintering operation be controlled such that the percentage of void to solid material remains comparatively high in the resulting article, i.e., in the range of between about 10 and about 30%.

It is to be emphasized here that the inclusion of a metal hydride binder in the base material prior to cold compaction, etc. and sintering, according to the present invention is not to be confused with the prior art practice of including hydrides as "sintering aids" in conventional powder metallurgical techniques. In those processes, there is relatively complete densification and melting of the entire mass, the metal hydride "sintering aid" actually fusing with and permeating the base material. In the process of the present invention, the binder is employed primarily as an agent to impart sufficient green strength to the green article, prior to sintering, to enable normal handling operations, although some aid to the sintering operation may be inherently produced.

After sintering, the end product may be treated in accordance with any of the conventional processes employed in the prior art. For example, in the production of fuel and control elements for use in nuclear reactors, it may be desirable to hydride or otherwise treat the end product with hydrogen. A unique advantage of elements prepared according to the process of the present invention is that after compaction, the green article may be transferred to a sintering furnace wherein hydriding or hydrogen absorption may be accomplished without the necessity for removing the end product from the sintering furnace.

The following examples are intended as illustrative of the present invention and should not be interpreted as limitative of the scope thereof which is defined by the appended claims.

Example 1

10 wt. percent of zirconium hydride powder having a −80 +270 mesh fraction was blended with 75 wt. percent of spherical zirconium powder having a nominal particle diameter of 0.001 in. After intimate mixing, the blend was loaded into a die and cold pressed under a compaction pressure of approximately 25 t.s.i. The article was removed from the die and examined. It was found to have a high degree of green strength and could be manipulated and handled without affecting its structure.

Analysis of the article by Metalgraphic examination indicated that the spheroidal nature of the zirconium particles was not affected. Sintering was then performed in a vacuum furnace at $5 \times 10^{-5}$ millimeters Hg and 900° C. The resulting product was found to possess a uniform and high degree of porosity. Subsequent hydrogenation yielded a uniformly hydrided element suitable for use as a control element in a nuclear reactor.

Examples 2 to 6

Following the procedure of Example 1, but substituting for the spherical zirconium powder, a spherical metallic powder, and for the zirconium hydride powder, a metallic hydride powder, each as set forth in the table below, corresponding porous, uniformly hydrided elements, suitable for use as control elements in nuclear reactors, are obtained.

TABLE

| Ex. | Spherical metallic powder | Metal hydride powder |
| --- | --- | --- |
| 2 | Zirconium, 90% by weight; uranium, 10% by weight. | Zirconium hydride $(ZrH_2)$. |
| 3 | Zirconium, 80% by weight; uranium, 20% by weight. | Do. |
| 4 | Uranium | Uranium hydride $(UH_3)$. |
| 5 | Uranium, 92% by weight; molybdenum, 8% by weight. | Do. |
| 6 | Yttrium | Yttrium hydride $(YH_2)$. |

What is claimed is:

1. A method of making porous bodies comprising intimately mixing discrete particles of base material selected from the group consisting of metals and metal alloys having a particle size of from about 0.0005 in. to 0.010 in. in diameter and a metal hydride binder having a particle size of from about $\frac{1}{10}$ to $\frac{1}{100}$ of the base particle diameter and subjecting said mixture to pressure sufficient to form a rigid, coherent body and insufficient to deform said discrete particles, the amount of said binder being sufficient to exert a binding force on each of said discrete base particles.

2. The method according to claim 1 including the step of sintering said rigid, coherent body.

3. The method according to claim 2 wherein said steps of subjecting said mixture to said pressure and sintering are performed in different apparatus.

4. The method according to claim 1 wherein said binder material is employed in an amount ranging from about 7% to about 25% based on said base material.

5. The method according to claim 1 wherein said discrete particles are of a spherical configuration.

6. The method according to claim 1 wherein said discrete particles are of an angular configuration.

7. The method according to claim 1 wherein said discrete particles are of an irregular configuration.

8. The method according to claim 1 wherein said pressure is exerted on said mixture of said base material and said binder by cold pressing.

9. The method according to claim 1 wherein said pressure is exerted on said mixture of said base material and said binder by extrusion.

10. The method according to claim 1 wherein said binder material is a hydride of a metal selected from the group consisting of Li, Mg, Ca, Sc, Ti, V, Sr, Y, Zr, Nb, Pd, Ba, La, Hf, Ta, Ac, Ce, Pr, Nd, Sm, Eu, Gd, Tb, Dy, Ho, Er, Tm, Yb, Lu, Th, Pa, U, Pu.

11. A method of making a porous body for use in a nuclear reactor selected from the group consisting of fuel elements and control elements comprising intimately mixing discrete particles of a base material selected from the group consisting of fissionable material, neutron absorbing material, neutron scattering material and mixtures thereof having a particle size of from about 0.0005 in. to 0.010 in. in diameter and a metal hydride binder having a particle size of from about $\frac{1}{10}$ to $\frac{1}{100}$ of the base particle diameter, subjecting said mixture to pressure sufficient to form a rigid, coherent body and insufficient to deform said discrete particles, the amount of said binder being sufficient to exert a binding force on each of said discrete particles and sintering said rigid, coherent body.

12. The method according to claim 11 wherein said steps of subjecting said mixture to said pressure and sintering are performed in different apparatus.

13. The method according to claim 11 wherein said binder material is employed in an amount ranging from about 7% to about 25% based on said base material.

14. The method according to claim 11 wherein said discrete particles are of a spherical configuration.

15. The method according to claim 11 wherein said discrete particles are of an angular configuration.

16. The method according to claim 11 wherein the base material and the binder material have an equivalent particle size.

17. The method according to claim 11 wherein said pressure is exerted on said mixture of said base material and said binder by cold pressing.

18. The method according to claim 11 wherein said pressure is exerted on said mixture of said base material and said binder by extrusion.

19. The method according to claim 11 wherein said binder material is a hydride of a metal selected from the group consisting of Li, Mg, Ca, Sc, Ti, V, Sr, Y, Zr, Nb, Pd, Ba, La, Hf, Ta, Ac, Ce, Pr, Nd, Sm, Eu, Gd, Tb, Dy, Ho, Er, Tm, Yb, Lu, Th, Pa, U, Pu.

20. A method according to claim 11 wherein said base material is a hydridable material.

21. A method according to claim 11 including the step of hydriding said sintered body.

22. A method according to claim 11 wherein said base material is a hydrogen absorbing material.

23. A method of making a porous body for use in a nuclear reactor comprising intimately mixing discrete substantially spherical, particles of zirconium having a particle size of from about −80 to about +325 mesh and from 7% to 25% based on said zirconium of zirconium hydride having a nominal particle size of 0.001 in. in diameter, cold pressing said mixture at a pressure of from about 20 to about 30 (t.)s.i. so as to form a rigid, coherent body while maintaining the spherical identity of said discrete particles of said zirconium and sintering said rigid, coherent body at a temperature of from about 900° C. to about 1100° C.

24. A method according to claim 23 including the step of subjecting said sintered body to treatment with hydrogen.

References Cited

UNITED STATES PATENTS

| | | | |
|---|---|---|---|
| 2,994,587 | 4/1961 | Vose | 23—204 |
| 3,018,169 | 1/1962 | Vetrano | 23—204 |
| 3,088,898 | 5/1963 | Busby et al. | 176—86 |
| 3,431,329 | 3/1969 | White et al. | 264—0.5 |

CARL D. QUARFORTH, Primary Examiner

S. HELLMAN, Assistant Examiner

U.S. Cl. X.R.

75—214; 252—301.1; 264—82